US010278376B2

(12) United States Patent
Caraballo, Sr.

(10) Patent No.: US 10,278,376 B2
(45) Date of Patent: May 7, 2019

(54) DEVICES AND METHODS FOR LURE ASSEMBLY HAVING REPLACEABLE SKIRT

(71) Applicant: Arrowhead Industries, Inc., Hickory, NC (US)

(72) Inventor: Miguel Caraballo, Sr., Hickory, NC (US)

(73) Assignee: Arrowhead Industries, Inc., Hickory, NC (US)

( * ) Notice: Subject to any disclaimer, the term of this patent is extended or adjusted under 35 U.S.C. 154(b) by 276 days.

(21) Appl. No.: 15/171,335

(22) Filed: Jun. 2, 2016

(65) Prior Publication Data

US 2016/0366863 A1 Dec. 22, 2016

Related U.S. Application Data

(60) Provisional application No. 62/182,145, filed on Jun. 19, 2015.

(51) Int. Cl.
| | |
|---|---|
| *A01K 85/00* | (2006.01) |
| *A01K 85/10* | (2006.01) |
| *A01K 85/08* | (2006.01) |
| *A01K 99/00* | (2006.01) |

(52) U.S. Cl.
CPC .............. *A01K 85/08* (2013.01); *A01K 85/00* (2013.01); *A01K 85/10* (2013.01); *A01K 99/00* (2013.01)

(58) Field of Classification Search
CPC ......... A01K 85/10; A01K 85/00; A01K 99/00
USPC ............ 43/42.28, 42.11, 42.13, 42.53, 42.09
See application file for complete search history.

(56) References Cited

U.S. PATENT DOCUMENTS

| | | | | | |
|---|---|---|---|---|---|
| 1,454,820 | A | * | 5/1923 | Readle ................... | A01K 85/00 43/42.05 |
| 2,166,585 | A | * | 7/1939 | Evans .................... | A01K 97/26 24/115 H |
| 2,237,534 | A | * | 4/1941 | Der Clute .............. | A01K 85/01 43/17.6 |
| 2,538,052 | A | * | 1/1951 | Schwarzer ............. | A01K 83/00 43/42 |

(Continued)

FOREIGN PATENT DOCUMENTS

| | | | | | |
|---|---|---|---|---|---|
| GB | 2087201 | A | * | 5/1982 | ............. A01K 85/10 |
| JP | 2002142614 | A | * | 5/2002 | |

(Continued)

OTHER PUBLICATIONS

Translation of JP2002-186383.*
Translation of JP2008-125407.*
Translation of JP2015-39352 (Year: 2015).*

*Primary Examiner* — Darren W Ark
(74) *Attorney, Agent, or Firm* — NK Patent Law

(57) ABSTRACT

A fishing lure assembly includes: a skirt mount from which a shank extends, the skirt mount having a non-circular profile with a maximum width; a skirt including a plurality of strands and a collar with a non-circular opening having a maximum dimension that is greater than the maximum width of the skirt mount. The skirt can be installed upon the skirt mount by passing the skirt mount through the opening when the maximum width of the skirt mount is aligned with the maximum dimension of the opening. The skirt is maintained as installed upon the skirt mount when the maximum width of the skirt mount is rotated out of alignment with the maximum dimension of the opening.

18 Claims, 6 Drawing Sheets

(56) References Cited

U.S. PATENT DOCUMENTS

| | | | | |
|---|---|---|---|---|
| 2,546,437 A * | 3/1951 | Gambill | | A01K 85/00 43/42.28 |
| 2,594,264 A * | 4/1952 | Riner | | A01K 85/08 43/42.27 |
| 2,618,094 A * | 11/1952 | Charles | | A01K 85/08 43/42.24 |
| 2,625,767 A * | 1/1953 | Pokras | | A01K 85/00 43/42.05 |
| 2,686,381 A * | 8/1954 | Peterson | | A01K 85/00 43/42.09 |
| 2,696,693 A * | 12/1954 | Markquart | | A01K 85/08 43/42.28 |
| 2,778,144 A * | 1/1957 | Clyde | | A01K 85/00 43/42.11 |
| 2,931,123 A * | 4/1960 | Luhr, Jr. | | A01K 83/06 43/41 |
| 2,940,204 A * | 6/1960 | Mehnert | | A01K 85/10 43/42.08 |
| 3,009,279 A * | 11/1961 | Jacobson | | A01K 85/18 43/42.09 |
| 3,169,336 A * | 2/1965 | Pope | | A01K 85/00 43/42.28 |
| 3,947,989 A * | 4/1976 | Bart | | A01K 85/16 43/42.09 |
| 4,006,551 A * | 2/1977 | Messacar | | A01K 85/16 43/42.04 |
| 4,133,135 A * | 1/1979 | Miles | | A01K 85/00 43/42.13 |
| 4,149,335 A * | 4/1979 | Duescher | | A01K 85/08 156/180 |
| 4,163,337 A * | 8/1979 | Kress | | A01K 85/00 43/42.25 |
| 4,215,506 A * | 8/1980 | LeBoeuf | | A01K 85/16 43/42.05 |
| 4,329,804 A * | 5/1982 | Brown | | A01K 85/00 43/42.09 |
| 4,799,329 A * | 1/1989 | Paulsen | | A01K 85/00 43/42.25 |
| 4,914,851 A * | 4/1990 | Acker | | A01K 85/02 43/42.05 |
| 5,113,607 A * | 5/1992 | Pate | | A01K 85/00 43/42.09 |
| 5,155,948 A * | 10/1992 | Kitagawa | | A01K 85/00 43/42.28 |
| 5,261,182 A * | 11/1993 | Link | | A01K 85/00 43/42.28 |
| 5,361,531 A * | 11/1994 | Rodrigues | | A01K 85/00 43/42.09 |
| 5,369,906 A * | 12/1994 | Anterni | | A01K 85/16 43/42.09 |
| 5,491,927 A * | 2/1996 | Ortiz | | A01K 85/00 43/42.28 |
| 5,661,921 A * | 9/1997 | Mason | | A01K 85/16 43/42.06 |
| 5,899,015 A * | 5/1999 | Link | | A01K 85/00 43/42.28 |
| 5,974,723 A * | 11/1999 | Taibi | | A01K 85/02 43/42.11 |
| 6,125,569 A * | 10/2000 | Link | | A01K 85/00 43/1 |
| 6,272,787 B1 * | 8/2001 | Link | | A01K 85/00 427/256 |
| 6,357,167 B1 * | 3/2002 | Bradford | | A01K 85/00 43/42.05 |
| 6,598,336 B2 * | 7/2003 | Link | | A01K 85/00 43/42.24 |
| 6,601,336 B1 * | 8/2003 | Link | | A01K 85/00 43/42.11 |
| 6,618,979 B2 * | 9/2003 | Wacha | | A01K 85/00 43/42.36 |
| 6,922,938 B1 * | 8/2005 | Ciuffo | | A01K 85/00 43/42.15 |
| 6,978,571 B1 * | 12/2005 | Nemire | | A01K 85/00 43/42.17 |
| 7,114,285 B1 * | 10/2006 | Ince | | A01K 85/00 43/42.26 |
| 7,240,454 B2 * | 7/2007 | Guigo | | A01K 85/00 43/42.36 |
| 7,360,335 B2 * | 4/2008 | Edwards | | A01K 85/00 43/42.13 |
| 8,146,288 B2 * | 4/2012 | Barczak | | A01K 85/00 43/42.12 |
| 8,196,336 B2 * | 6/2012 | Nicholson, III | | A01K 85/00 43/42.24 |
| 8,434,258 B2 * | 5/2013 | Greene | | A01K 85/00 43/42.28 |
| 8,484,884 B2 * | 7/2013 | Zuk | | A01K 85/01 43/42.06 |
| 8,615,920 B2 * | 12/2013 | Taylor | | A01K 85/16 43/42.09 |
| 8,869,446 B2 * | 10/2014 | Parks | | A01K 85/02 43/42.28 |
| 8,978,289 B2 * | 3/2015 | Willis | | A01K 85/00 43/42.11 |
| 9,288,972 B1 * | 3/2016 | Link | | A01K 85/18 |
| 9,622,463 B2 * | 4/2017 | Thompson | | A01K 85/16 |
| 9,936,681 B2 * | 4/2018 | Mancini | | A01K 85/00 |
| 2006/0032109 A1 * | 2/2006 | Chiodo | | A01K 85/16 43/42.09 |
| 2006/0236588 A1 * | 10/2006 | Rapelje | | A01K 85/00 43/42.29 |
| 2006/0260178 A1 * | 11/2006 | Jones | | A01K 85/00 43/42.36 |
| 2008/0148623 A1 * | 6/2008 | Uhrig | | A01K 85/00 43/42.39 |
| 2008/0236022 A1 * | 10/2008 | Harrell | | A01K 85/00 43/42.39 |
| 2011/0162254 A1 * | 7/2011 | Smits | | A01K 85/00 43/42.36 |
| 2013/0180158 A1 * | 7/2013 | Butters | | A01K 85/02 43/42.1 |
| 2013/0247444 A1 * | 9/2013 | Young | | A01K 85/00 43/42.09 |
| 2013/0318857 A1 * | 12/2013 | Daniel | | A01K 85/00 43/42.09 |

FOREIGN PATENT DOCUMENTS

| | | | | |
|---|---|---|---|---|
| JP | 2002186383 A | * | 7/2002 | |
| JP | 2006223284 A | * | 8/2006 | |
| JP | 2008113582 A | * | 5/2008 | |
| JP | 2008125407 A | * | 6/2008 | |
| JP | 2008212146 A | * | 9/2008 | |
| JP | 2010273637 A | * | 12/2010 | |
| JP | 2014217334 A | * | 11/2014 | |
| JP | 2015039352 A | * | 3/2015 | |
| JP | 2017123805 A | * | 7/2017 | |
| JP | 2018014955 A | * | 2/2018 | |
| KR | 20080045619 A | * | 5/2008 | |
| KR | 20130110334 A | * | 10/2013 | |

* cited by examiner

DEVICES AND METHODS FOR LURE ASSEMBLY HAVING REPLACEABLE SKIRT

CROSS-REFERENCE TO RELATED APPLICATION

This application claims the benefit of priority of U.S. provisional patent application No. 62/182,145, titled "FISHING LURE WITH SELECTIVELY REMOVABLE SKIRT HAVING IMPROVED WEAR PERFORMANCE," filed on Jun. 19, 2015 which is incorporated herein in its entirety by this reference.

TECHNICAL FIELD

The present disclosure relates to fishing lures and methods of preparing fishing lures. More particularly, the present disclosure relates to a fishing lure assembly having a selectable skirt for installation and a skirt mount for receiving the skirt.

BACKGROUND

Fishing lures are used to attract a fish to bite at the lure so the fish is hooked and reeled or drawn in for sport or consumption. Many lures have a skirt surrounding the lure that includes a plurality of elongated strands that flex in water while the lure is being drawn through water. This motion tends to attract fish to bite the lure.

One problem associated with conventional skirts is that an elastic band is typically used to secure the skirt to the lure and the band tends to break after a limited number of uses. When the band breaks, the skirt is lost in the water and the lure is rendered unusable. This requires either replacement of the skirt, which is time consuming, or replacement of the entire lure, which can become expensive for an avid fisherman.

Additionally, users would prefer to be able to mix lure bodies of certain designs, colors, and the like, with skirts also of certain designs, colors, and the like. A fixed lure and skirt portion do not allow for this interchangeability.

An improved lure assembly is thus needed.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In at least one embodiment, a fishing lure assembly includes: a skirt mount from which a shank extends along a longitudinal axis, the skirt mount having a non-circular profile when viewed along the longitudinal axis, the non-circular profile of the skirt mount having a maximum width; and a skirt including a collar and a plurality of strands carried by the collar, the collar defining a non-circular opening having a maximum dimension that is greater than the maximum width of the non-circular profile of the skirt mount, and a minimum dimension that is less than the maximum width of the non-circular profile of the skirt mount.

In at least one example, the skirt is configured to be installed upon the skirt mount by passage of the skirt mount through the non-circular opening when the maximum width of the non-circular profile of the skirt mount is aligned with the maximum dimension of the non-circular opening.

In at least one example, the skirt is maintained as installed upon the skirt mount when the maximum width of the non-circular profile of the skirt mount is rotated out of alignment with the maximum dimension of the non-circular opening by rotation of the collar relative to the skirt mount around the longitudinal axis.

In at least one example, the skirt mount includes a body that tapers along the longitudinal axis from a relatively broader first end of the body to a relatively narrow second end of the body opposite the first end.

In at least one example, the body defines the non-circular profile of the skirt mount as rectangular.

In at least one example, the maximum width of the non-circular profile of the skirt mount is defined at the first end of the body.

In at least one example, the shank extends from the second end of the body of the skirt mount to a bend and a barbed point defining a hook.

In at least one example, a neck extends from the first end of the body of the skirt mount, wherein the maximum width of the non-circular profile of the skirt mount is greater than any dimension of the neck when viewed along the longitudinal axis.

In at least one example, a head extends from the neck opposite the first end of the body of the skirt mount, the head being broader than the neck.

In at least one example, the collar of the skirt is trapped at the neck between the body of the skirt mount and the head when the skit is mounted on the skirt mount.

In at least one example, a wire form has a shaft that extends from the head opposite the neck, the wire form including a lead portion for attachment of the lure assembly to a line.

In at least one example, the collar includes a rod formed into a curve at least partially surrounding the non-circular opening.

In at least one example, the strands have medial portions gathered by the collar.

In at least one embodiment, a method of preparing a fishing lure assembly includes: installing a skirt upon a skirt mount from which a shank extends along a longitudinal axis; wherein the skirt mount has a non-circular profile when viewed along the longitudinal axis, and the non-circular profile of the skirt mount has a maximum width; and wherein the skirt includes a collar and a plurality of strands carried by the collar, the collar defining a non-circular opening having a maximum dimension that is greater than the maximum width of the non-circular profile of the skirt mount, and a minimum dimension that is less than the maximum width of the non-circular profile of the skirt mount.

In at least one example, installing the skirt upon the skirt mount includes passing the skirt mount at least partially through the non-circular opening when the maximum width of the non-circular profile of the skirt mount is aligned with the maximum dimension of the non-circular opening.

In at least one example, the skirt mount includes a body that tapers along the longitudinal axis from a relatively broader first end of the body to a relatively narrow second end of the body opposite the first end, and wherein passing the skirt mount at least partially through the non-circular opening includes passing the second end of the body through the non-circular opening before passing the first end of the body through the non-circular opening.

In at least one example, a neck extends from the first end of the body of the skirt mount, wherein the maximum width of the non-circular profile of the skirt mount is greater than any dimension of the neck when viewed along the longitudinal axis, and wherein passing the skirt mount at least partially through the non-circular opening further includes positioning the collar at least partially around the neck and tightening the collar.

In at least one example, installing the skirt upon the skirt mount further includes rotating the collar relative to the skirt mount around the longitudinal axis until the maximum width of the non-circular profile of the skirt mount is rotated out of alignment with the maximum dimension of the non-circular opening.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
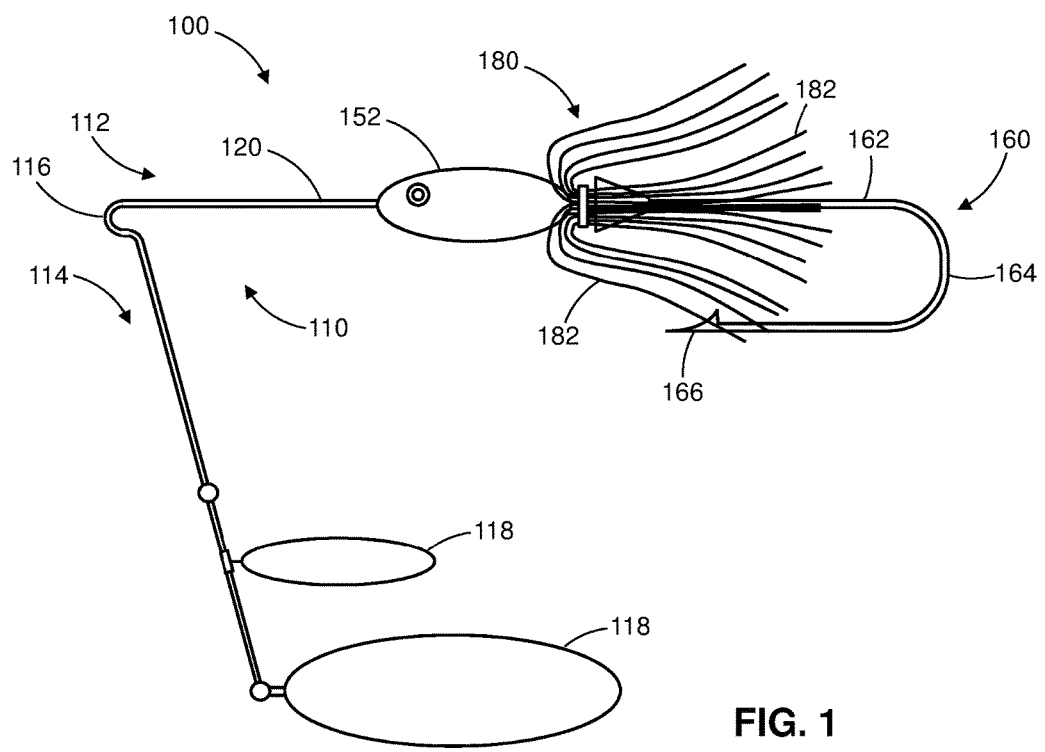
FIG. 1 is a plan view of a lure assembly in which a replaceable skirt is carried by a skirt mount according to at least one embodiment.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

FIG. 1 is a plan view of a lure assembly 100 in which a replaceable skirt 180 is carried by a skirt mount 130 (FIG. 2) according to at least one embodiment. A wire form 110 (FIG. 1) serves as a frame for the lure assembly 100. The wire form 110 has a first arm portion 112 that carries the skirt mount 130 and a hook 160. The wire form 110 has a second arm portion 114 that carries terminal tackle elements 118. The first arm portion 112 and second arm portion 114 of the wire form 110 extend rearward from a lead portion 116 to which a line or leader is attached when the lure assembly 100 is in use.

In the illustrated embodiment, the lead portion 116 is defined by a rearward opening bend in the wire form 110. The lead portion 116 defines the forward end of the lead portion 116. Terms such as forward and rearward are used in these descriptions as relative terms for convenience. Forward generally refers to the direction in which the lure assembly 100 will travel in water when pulled along by the lead portion 116 with the first arm portion 112 and second arm portion 114 trailing rearward of the lead portion 116.

Figure 2:
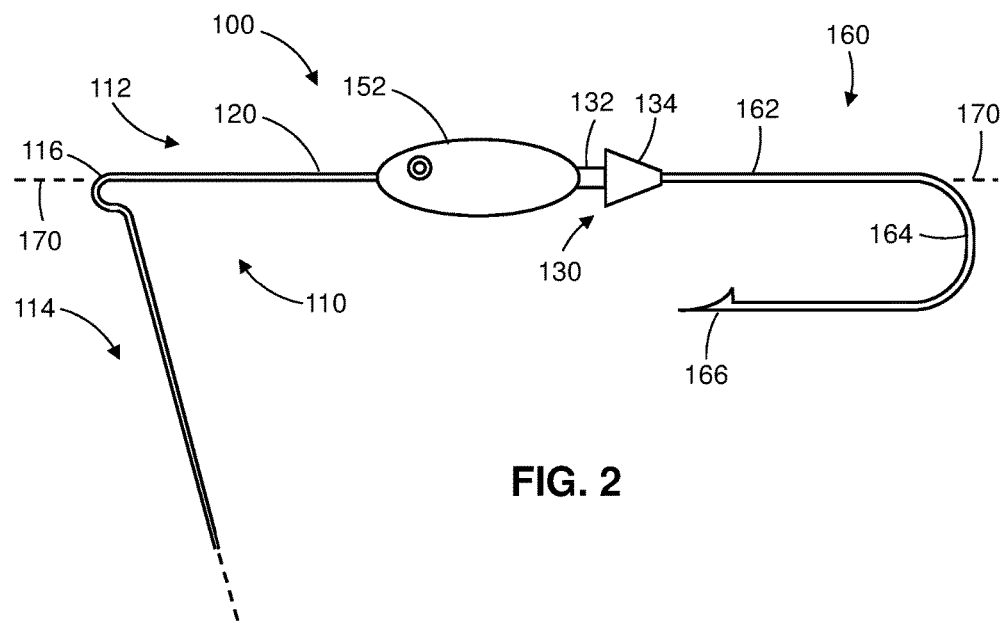
FIG. 2 is a plan view of a portion of the lure assembly of FIG. 1, showing the skirt mount without the replaceable skirt.

FIG. 2 is a plan view of the first arm portion 112 of the wire form 110 showing the skirt mount 130 without the replaceable skirt 180. As shown, the first arm portion 112 has a forward shaft 120 that extends longitudinally from the lead portion 116 to the skirt mount 130. The hook 160 extends rearwardly from the skirt mount 130. The hook 160 includes a shank 162 extending longitudinally from the rearward end of the skirt mount 130, a bend 164 connected to the shank 162, and a barbed point 166 extending forward from the bend 164.

For illustration and description, a longitudinal axis 170 is shown in FIG. 2 as extending with the forward shaft 120 and shank 162. In the drawings, the forward shaft 120 and shank 162 are shown as collinear with the longitudinal axis 170. In physical embodiments, where flexure of the wire frame form 110 may occur and where the shank 162 of the hook 160 may have some curvature, the shaft 120 and shank 162 can nonetheless be described as extending longitudinally, and a longitudinal axis can be locally defined as a tangent to any generally linear element having some slight curvature or flexure. In the illustrated embodiment, the wire form 110 lays approximately in, and thus defines, a plane in which the longitudinal axis 170 extends.

Figure 3A:
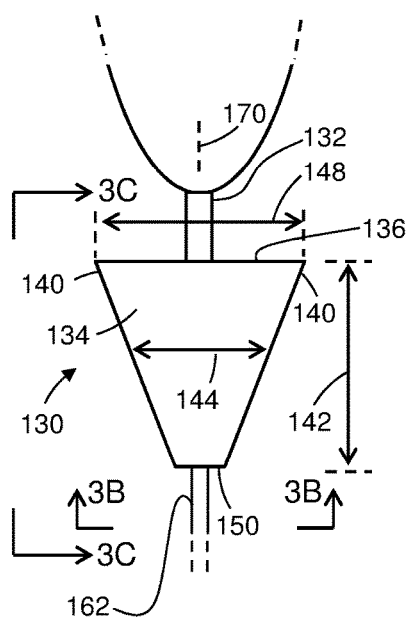
FIG. 3A is a plan view, as taken from the same perspective as that of FIGS. 1 and 2, of the skirt mount, according to at least one embodiment.

The skirt mount 130 serves to engage and retain the replaceable skirt 180. FIG. 3A is a plan view, as taken from the same perspective as that of FIGS. 1 and 2, of the skirt mount. The skirt mount 130 has a forward neck 132 and rearward body 134. The forward end 136 of the body 134 has lateral shoulders 140 serving to retain the replaceable skirt 180 when desired as described below with reference to FIGS. 7 and 8.

Figure 3B:
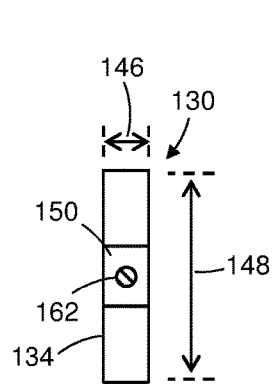
FIG. 3B is a longitudinal view of the rearward end of the skirt mount, according to at least one embodiment, taken along the line 3B-3B in FIG. 3A.
Figure 3C:
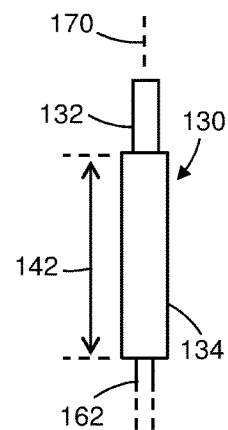
FIG. 3C is a side view of the skirt mount, according to at least one embodiment, taken along the line 3C-3C in FIG. 3A.

FIG. 3B is a longitudinal view of the rearward end of the skirt mount 130, according to at least one embodiment, taken along the line 3B-3B in FIG. 3A. FIG. 3C is a side view of the skirt mount 130, according to at least one embodiment, taken along the line 3C-3C in FIG. 3A. The body 134 has a length 142 (FIG. 3C) defined along the longitudinal axis 170, a varying width 144 (FIG. 3A) defined in the plane of the wire form 110 (FIG. 2), and a thickness 146 (FIG. 3B) defined as orthogonal to the length 142 and width 144 and as perpendicular to the plane of the wire form 110.

The body 134 in the illustrated embodiment has a trapezoidal shape or profile in the plane of the wire form as when viewed along the longitudinal axis as in the perspective of FIGS. 2 and 3A. The maximum width 148 of the profile of the body 134 when viewed along the longitudinal axis, which is defined at the forward end 136, is greater than its thickness 146 (FIG. 3B). This feature is advantageous for mounting and retaining the replaceable skirt 180 when desired as described below with reference to FIGS. 7 and 8. Furthermore, the maximum width 148 is greater than any width or thickness of the neck 132, referring to dimensions perpendicular to the longitudinal axis 170, whereas the neck 132 may extend longitudinally to any length. The neck 132, for example, may be cylindrically shaped having a fixed diameter that is less than the maximum width 148 of the body 134. In the illustrated embodiment, the varying width 144 of the body 134 tapers from its relatively broader forward end 136 to its relatively narrow rearward end 150. The body 134 has a non-circular profile or cross-section when viewed along the longitudinal axis 170. In the illustrated embodiment, the body 134 has a rectangular (FIG. 3B) profile or cross-section when viewed along the longitudinal axis 170. Other non-circular cross-sections or profiles are within the scope of these descriptions.

In the illustrated embodiment of the lure 100, a head 152 is connected to the forward end of the neck 132 of the skirt mount 130. The head 152 is shown as having greater width, defined in the plane of the wire form 110 and perpendicular to the longitudinal axis 170, than any width or thickness of the neck 132. Thus, in the illustrated embodiment, the neck 132 is circumferentially reduced or narrow relative to both the head 152 and shoulders 140. This feature is advantageous for retaining the replaceable skirt 180 when desired as described below with reference to FIGS. 7-8. The head 152 is shown as having an eye so as to visibly resemble a bait fish. Other likenesses are within the scope of these descriptions.

Figure 4A:
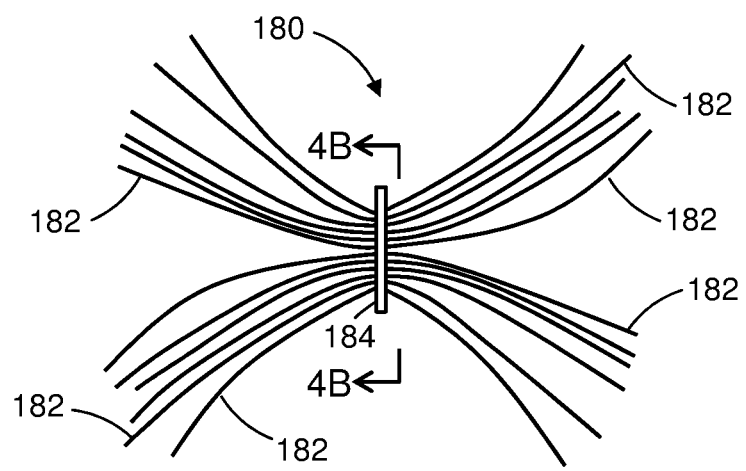
FIG. 4A is a view of a replaceable skirt according to at least one embodiment.

FIG. 4A is a view of a replaceable skirt 180 according to at least one embodiment. The skirt 180 includes a plurality of strands 182 gathered at their medial portions by a collar 184. The strands 182 may be formed of various materials. The strands 182 are flexible and may be elastically resilient to allow for a desired movement of the strands while the lure is being drawn through water when in use.

Figure 4B:
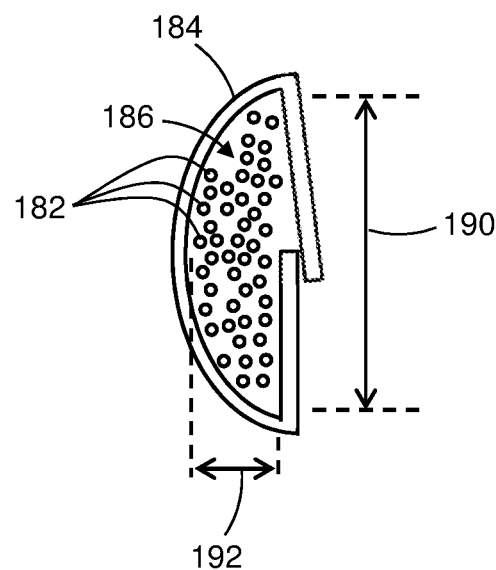
FIG. 4B is a longitudinal view of the replaceable skirt of FIG. 4A, taken along the line 4B-4B in FIG. 4A.

FIG. 4B is a longitudinal view of the replaceable skirt 180 of FIG. 4A, taken along the line 4B-4B in FIG. 4A, thus showing the profile of the collar 184 as viewed along the longitudinal axis 170. The illustrated collar 184 has a non-circular profile or cross-section, when viewed along the longitudinal axis 170, and is dimensioned to permit passage of the body 134 of the skirt mount 130 in one relative orientation (FIG. 6) to permit the skirt to be mounted on the skirt mount 130, and subsequently prevent such passage in another relative orientation (FIG. 7), so as to retain the skirt 180 upon the skirt mount 130.

The collar 184 (FIG. 4B) is illustrated as having a crescent or half-circle shape and is configured as a D-ring. Other configurations are within the scope of these descriptions. The collar 184 in at least one embodiment is constructed as a metal wire or rod bent or crimped into a closed or approximately closed curve or path so as to surround or at least partially surround a non-circular opening 186. The collar 184 is positioned around the plurality of strands 182 to gather the strands and form the skirt 180. The non-circular opening 186 of the collar 184 has a maximum dimension 190 sized to permit passage of the maximum width 148 of the body 134 of the skirt mount 130. The non-circular opening 186 of the collar 184 has lesser dimensions, for example the minimum dimension 192, which are less than the maximum dimension 190. Furthermore, the lesser dimensions of the opening 186, for example the minimum dimension 192, are less than the maximum width 148 of the profile of the body 134 when viewed along the longitudinal axis.

Figure 5A:
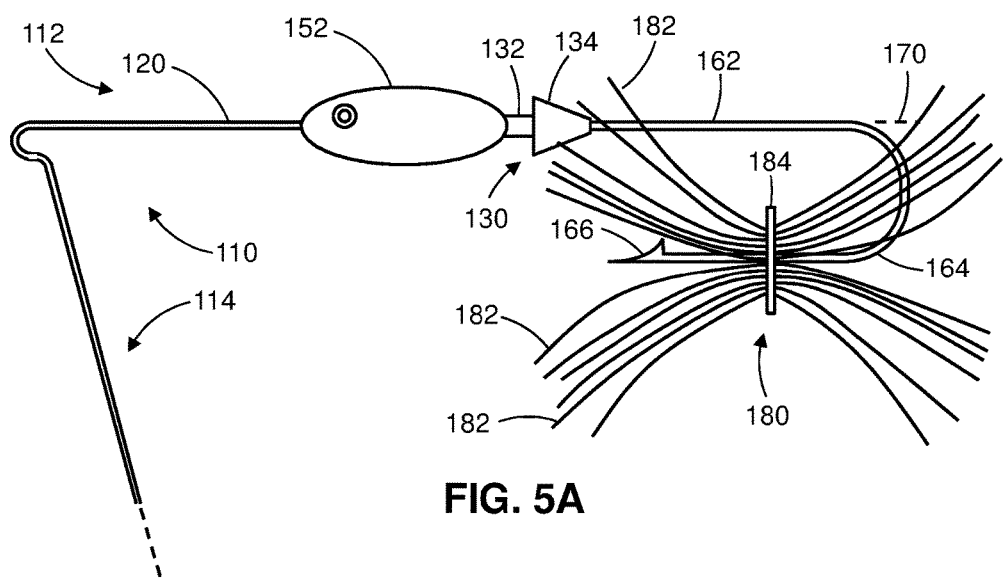
FIG. 5A is the first of several views of the replaceable skirt of FIGS. 4A-4B being installed upon the skirt mount of FIG. 2 according to at least one embodiment.
Figure 5B:
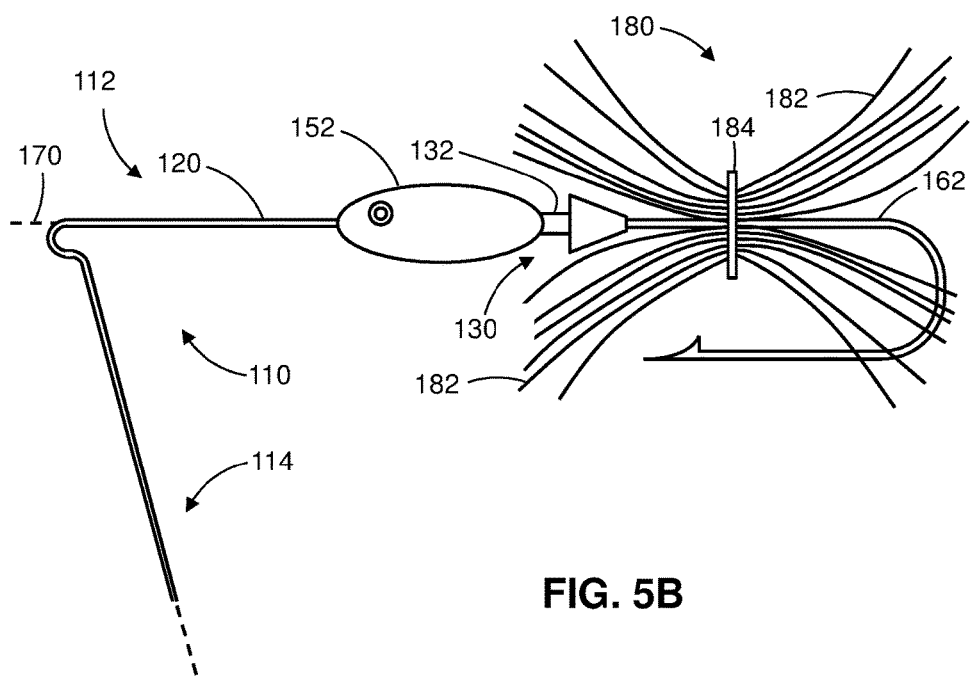
FIG. 5B is the second of several views of the replaceable skirt being installed upon the skirt mount and sequentially follows FIG. 5A.
Figure 5C:
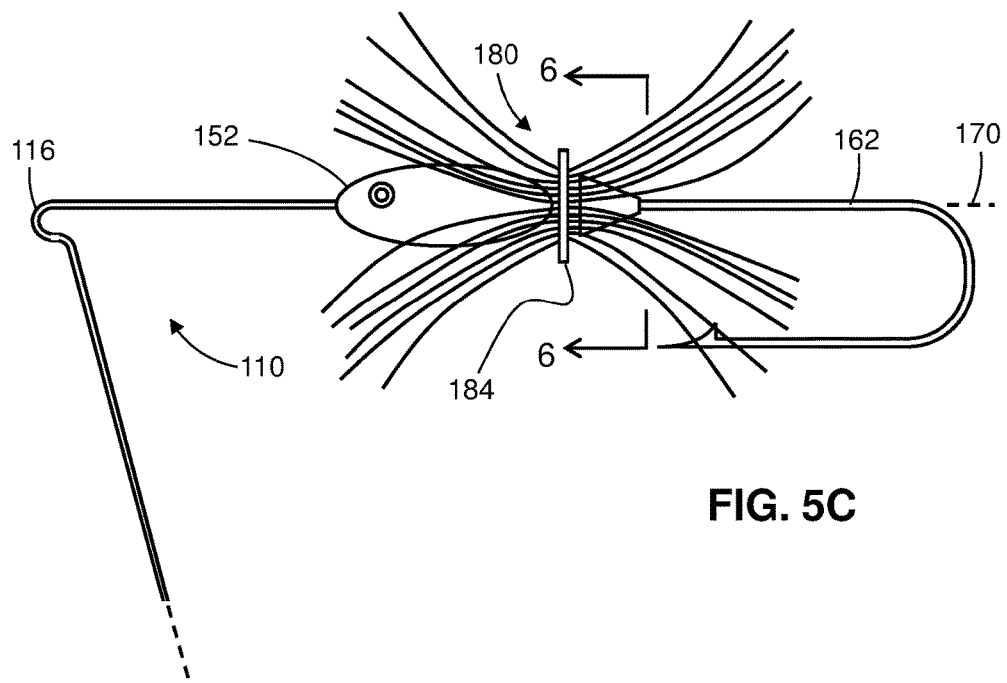
FIG. 5C is the third of several views of the replaceable skirt being installed upon the skirt mount and sequentially follows FIG. 5B.
Figure 5D:
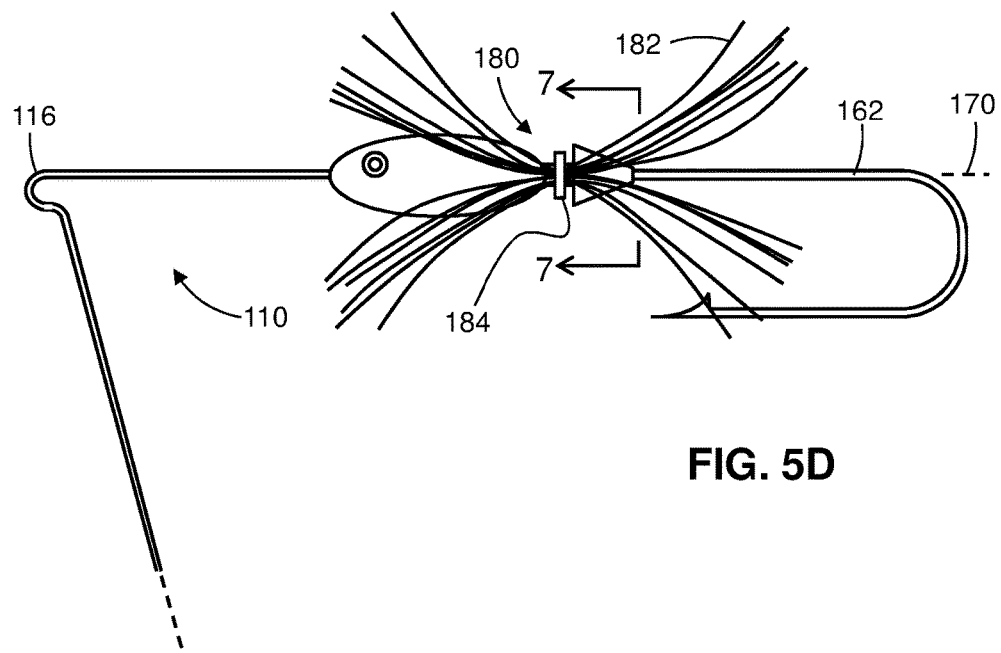
FIG. 5D is the fourth of several views of the replaceable skirt being installed upon the skirt mount and sequentially follows FIG. 5C.
Figure 6:
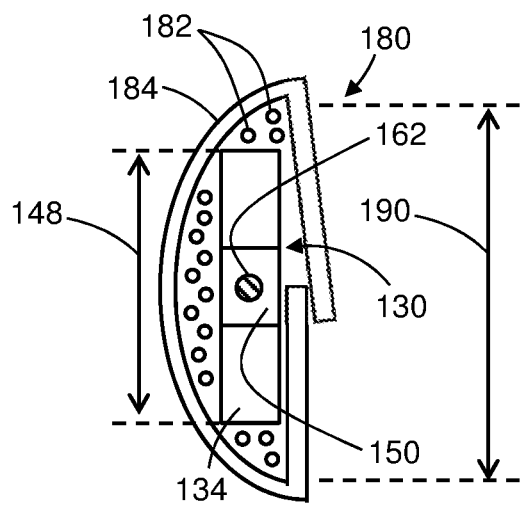
FIG. 6 is a longitudinal view, taken along the line 6-6 in FIG. 5C, of the collar of the skirt oriented to permit passage of the body of the skirt mount to permit assembly of the lure assembly according to at least one embodiment.

FIGS. 5A-5D are views of the replaceable skirt 180 being installed upon the lure assembly 100 according to at least one embodiment. In FIG. 5A, the point 166 of the hook 160 has been passed through the collar 184 as the skirt 180 and is moved toward the bend 164. In FIG. 5B, the skirt 180 is moved to the shank 162 and approaches the skirt mount 130. In FIG. 5C, the skirt 180 is mounted upon the skirt mount 130 with the collar 184 surrounding the neck 132. In order to pass the body 134 of the skirt mount 130 through the collar 184, the relative orientation of FIG. 6 is achieved for example by hand by a user. In FIG. 6, the maximum width 148 of the body 134 of the skirt mount 130 is approximately parallel or aligned with the maximum dimension 190 of the opening of the collar 184, such that the shoulders 140 (FIG. 3A) are permitted to pass through without engaging the collar 184 the collar.

Figure 7:
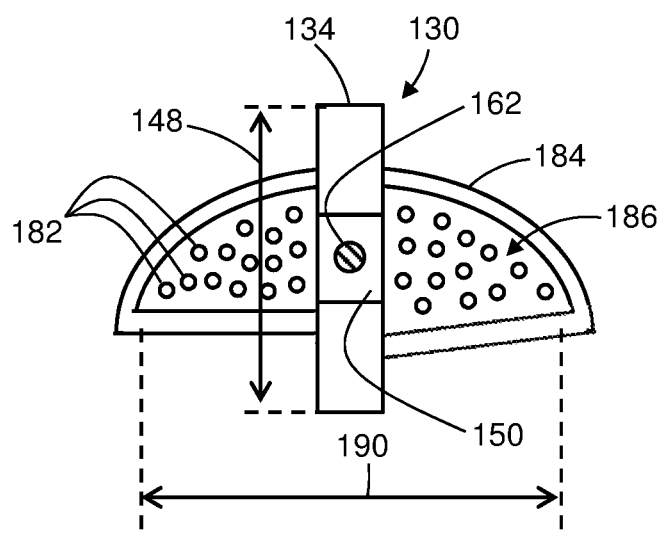
FIG. 7 is a longitudinal view, taken along the line 7-7 in FIG. 5D, of the collar of the skirt oriented to prevent passage of the body of the skirt mount to maintain assembly of the lure assembly according to at least one embodiment.

In order to prevent the dismounting of the skirt 180 from the skirt mount 130, another relative orientation, for example that of FIG. 7, is achieved such that the maximum width 148 of the body 134 of the skirt mount 130 is not parallel to or aligned with the maximum dimension 190. In FIG. 7, the maximum width 148 of the body 134 of the skirt mount 130 is approximately perpendicular to the maximum dimension 190. When the maximum width 148 of the body 134 of the skirt mount 130 is not parallel to or aligned with the maximum dimension 190, the shoulders 140 (FIG. 3A) engage the collar 184 and thus are prevented from passing back through the collar 184. The relative orientations of FIGS. 6 and 7 are selectively achieved by rotation, for example by ninety degrees in the illustrated embodiment, of the collar 184 around the longitudinal axis 170 relative to the skirt mount 130.

While the body 134 (FIG. 3B) of the skirt mount 130 is illustrated as having a rectangular profile or cross-section as viewed along the longitudinal axis 170, and the collar 184 (FIG. 4B) is illustrated as a D-ring having a crescent or half-circle shape, other non-circular profiles or cross-sections are within the scope of these descriptions. These particularly illustrated examples and other within the scope of these descriptions include that both the body 134 and collar 184 are non-circular so as to allow a non-engaged (FIG. 6) position or orientation of the collar 184 and shoulders 140 and an engaged (FIG. 7) position or orientation of the collar 184 and shoulders 140 reached by rotation of the collar 184 relative to the skirt mount 130. Furthermore, while the skirt mount 130 is shown in the drawings as having fine or sharp edges, the edges can be beveled or radiused in various embodiments.

Once the configuration of the FIG. 5C is achieved, the skirt 180 can be tightened, as shown in FIG. 1, around the neck 132 by cinching or crimping the collar 184, thus trapping the collar 184, for example between the body 134 and head 152. The head 152 is an optional feature of the lure assembly 100. In an example that includes the head 152, the collar 184 is trapped at the narrow neck 132 between the broader head 152 and body 134.

The taper of the body 134 assists in displacing the strands 182 into more peripheral portions of the collar 184 as the skirt 180 is being installed upon the skirt mount 130. Whether or not the collar 184 is tightened upon the neck 132 once installed, the redistribution of the strands 182 between the neck 132 and collar 184 once installation is complete helps to maintain the position of the collar around the neck.

The second arm portion 114 of the wire form 110 is shown in FIG. 1 to carry terminal tackle elements including a bead, and weights or spinners 118 provided to create audible and visual sensations to attract fish. Various other elements and configurations for terminal tackle elements are within the scope of these descriptions.

Advantageously, a skirt 180 can be selected at the time of purchase according to preferences, for example in conjunction with the selection of other elements of a lure assembly 100. Various colors and other strand properties can be selectively matched to user preferences, for example in conjunction with choosing other elements of a lure assembly. In the event the skirt 180 is lost or damaged, another can be selected and installed. Thus, the effective lifetime and variability of the lure assembly are improved.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A fishing lure assembly comprising:
    a skirt mount from which a shank extends along a longitudinal axis of the fishing lure assembly, the skirt mount having a non-circular profile when viewed along the longitudinal axis, the non-circular profile of the skirt mount having a maximum width; and
    a skirt including a collar and a plurality of strands carried by the collar, the collar defining a non-circular opening having a maximum dimension that is greater than the maximum width of the non-circular profile of the skirt mount, and a minimum dimension that is less than the maximum width of the non-circular profile of the skirt mount,
    wherein the collar comprises a metal wire or rod shaped to at least partially surround the non-circular opening,
    wherein the skirt is configured to be installed upon the skirt mount by passage of at least part of the skirt mount through the non-circular opening of the collar when the maximum width of the non-circular profile of the skirt mount is aligned with the maximum dimension of the non-circular opening of the collar, and
    wherein the skirt is maintained as installed upon the skirt mount when the maximum width of the non-circular profile of the skirt mount is rotated out of alignment with the maximum dimension of the non-circular opening of the collar by rotation of the collar relative to the skirt mount around the longitudinal axis.

2. The fishing lure assembly of claim 1, wherein the skirt mount includes a body that tapers along the longitudinal axis from a relatively broader first end of the body to a relatively narrow second end of the body opposite the first end.

3. The fishing lure assembly of claim 2, wherein the body defines the non-circular profile of the skirt mount as rectangular.

4. The fishing lure assembly of claim 2, wherein the maximum width of the non-circular profile of the skirt mount is defined at the first end of the body.

5. The fishing lure assembly of claim 4, wherein the shank extends from the second end of the body of the skirt mount to a bend and a barbed point defining a hook.

6. The fishing lure assembly of claim 5, further comprising a neck extending from the first end of the body of the skirt mount, wherein the maximum width of the non-circular profile of the skirt mount is greater than any dimension of the neck when viewed along the longitudinal axis.

7. The fishing lure assembly of claim 6, further comprising a head extending from the neck opposite the first end of the body of the skirt mount, the head being broader than the neck.

8. The fishing lure assembly of claim 7, wherein the collar of the skirt is trapped at the neck between the body of the skirt mount and the head when the skirt is mounted on the skirt mount.

9. The fishing lure assembly of claim 8, further comprising a wire form having a shaft that extends from the head opposite the neck, the wire form including a lead portion for attachment of the lure assembly to a line.

10. The fishing lure assembly of claim 1, wherein the collar comprises the metal rod formed into a curve at least partially surrounding the non-circular opening.

11. The fishing lure assembly of claim 10, wherein the strands have medial portions gathered by the collar.

12. The fishing lure assembly of claim 1, wherein the collar comprises the metal wire which has two ends.

13. The fishing lure assembly of claim 12, wherein the collar comprises the metal wire shaped into a closed path such that the metal wire surrounds the non-circular opening and the two ends overlap.

14. A method of preparing a fishing lure assembly, the method comprising:
    installing a skirt upon a skirt mount from which a shank extends along a longitudinal axis of the fishing lure assembly;
    wherein the skirt mount has a non-circular profile when viewed along the longitudinal axis, and the non-circular profile of the skirt mount has a maximum width; and
    wherein the skirt includes a collar and a plurality of strands carried by the collar, the collar defining a non-circular opening having a maximum dimension that is greater than the maximum width of the non-circular profile of the skirt mount, and a minimum dimension that is less than the maximum width of the non-circular profile of the skirt mount,
    wherein the collar comprises a metal wire or rod shaped to at least partially surround the non-circular opening,
    wherein installing the skirt upon the skirt mount comprises:

passing the skirt mount at least partially through the non-circular opening of the collar when the maximum width of the non-circular profile of the skirt mount is aligned with the maximum dimension of the non-circular opening of the collar; and rotating the collar relative to the skirt mount around the longitudinal axis until the maximum width of the non-circular profile of the skirt mount is rotated out of alignment with the maximum dimension of the non-circular opening.

15. The method of claim 14, wherein the skirt mount includes a body that tapers along the longitudinal axis from a relatively broader first end of the body to a relatively narrow second end of the body opposite the first end, and wherein passing the skirt mount at least partially through the non-circular opening comprises passing the second end of the body through the non-circular opening before passing the first end of the body through the non-circular opening.

16. The method of claim 14, wherein a neck extends from the first end of the body of the skirt mount, wherein the maximum width of the non-circular profile of the skirt mount is greater than any dimension of the neck when viewed along the longitudinal axis, and wherein passing the skirt mount at least partially through the non-circular opening further comprises positioning the collar at least partially around the neck and tightening the collar.

17. The method of claim 14, wherein the collar comprises the metal wire which has two ends.

18. The method of claim 17, wherein the collar comprises the metal wire shaped into a closed path such that the metal wire surrounds the non-circular opening and the two ends overlap.

* * * * *